(12) United States Patent
Iizuka et al.

(10) Patent No.: US 10,995,655 B2
(45) Date of Patent: May 4, 2021

(54) FUEL INJECTION DEVICE

(71) Applicant: HITACHI AUTOMOTIVE SYSTEMS, LTD., Ibaraki (JP)

(72) Inventors: Akira Iizuka, Hitachinaka (JP); Tohru Ishikawa, Hitachinaka (JP); Takao Miyake, Hitachinaka (JP); Kazuki Yoshimura, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 62 days.

(21) Appl. No.: 16/347,099

(22) PCT Filed: Nov. 21, 2017

(86) PCT No.: PCT/JP2017/041766
§ 371 (c)(1),
(2) Date: May 2, 2019

(87) PCT Pub. No.: WO2018/101118
PCT Pub. Date: Jun. 7, 2018

(65) Prior Publication Data
US 2019/0257264 A1    Aug. 22, 2019

(30) Foreign Application Priority Data

Nov. 30, 2016   (JP) .............................. JP2016-231986

(51) Int. Cl.
*F02B 23/06*    (2006.01)
*F02F 1/24*    (2006.01)
(Continued)

(52) U.S. Cl.
CPC ........ *F02B 23/0669* (2013.01); *F02B 23/066* (2013.01); *F02F 1/242* (2013.01);
(Continued)

(58) Field of Classification Search
CPC ... F02B 23/0669; F02B 23/066; F02M 61/18; F02M 51/06; F02F 1/242; F02F 1/42; Y02T 10/12
See application file for complete search history.

(56) References Cited

U.S. PATENT DOCUMENTS

| 7,543,560 B2* | 6/2009 | Kihara | ............... F02M 61/1806 |
| | | | 123/298 |
| 2002/0185104 A1* | 12/2002 | Arndt | ................. F02M 61/1826 |
| | | | 123/299 |

(Continued)

FOREIGN PATENT DOCUMENTS

| EP | 1 719 903 A1 | 11/2006 |
| EP | 2 677 158 B1 | 12/2016 |

(Continued)

OTHER PUBLICATIONS

International Search Report dated Mar. 13, 2018 for the PCT International Application No. PCT/JP2017/041766.

*Primary Examiner* — Xiao En Mo
(74) *Attorney, Agent, or Firm* — Volpe Koenig

(57) ABSTRACT

A fuel injection device including a valve body having an injection hole-formed part having a plurality of injection holes on the leading end side of the valve body. An injection hole comprises a crossing angle, θ1, between a central axis of the injection hole-formed part and an injection hole axis, and another injection hole comprises a crossing angle, θ2, between the central axis and another injection hole axis. θ2 is larger than θ1. The injection holes are formed such that a distance between the central axis and an inlet surface center of the injection hole is longer than a distance between the central axis and another inlet surface center of the another injection hole. A straight line beyond an outlet surface in the injection hole axis does not intersect with another straight line beyond another outlet surface in the another injection hole axis.

9 Claims, 9 Drawing Sheets

(51) Int. Cl.
*F02F 1/42* (2006.01)
*F02M 61/18* (2006.01)
*F02M 51/06* (2006.01)

(52) U.S. Cl.
CPC .............. *F02F 1/42* (2013.01); *F02M 51/06* (2013.01); *F02M 61/18* (2013.01)

(56) References Cited

U.S. PATENT DOCUMENTS

| | | | |
|---|---|---|---|
| 2007/0000476 A1* | 1/2007 | Mizobuchi | F02M 61/1853 123/305 |
| 2007/0012805 A1* | 1/2007 | Maier | F02M 61/1833 239/533.12 |
| 2007/0074504 A1 | 4/2007 | Driscoll et al. | |
| 2015/0020769 A1* | 1/2015 | Huang | F02D 19/0647 123/305 |

FOREIGN PATENT DOCUMENTS

| | | |
|---|---|---|
| GB | 1214242 A1 | 12/1970 |
| JP | 61-005368 U | 1/1986 |
| JP | 2005-054676 A | 3/2005 |
| JP | 2014-001660 A | 1/2014 |
| WO | 2009/067495 A2 | 5/2009 |
| WO | 2015/149039 A2 | 10/2015 |

\* cited by examiner

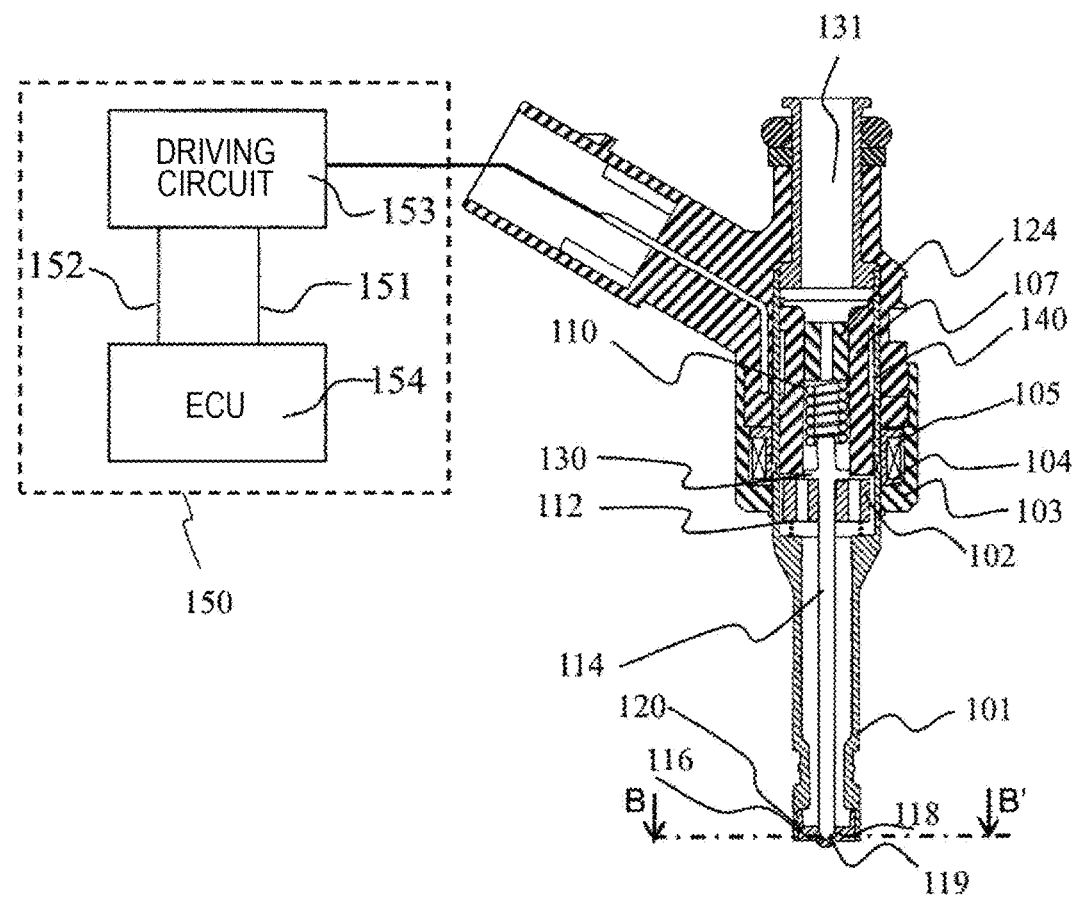

ENLARGED VIEW 4011

ENLARGED VIEW 4021

FUEL INJECTION DEVICE

TECHNICAL FIELD

The present invention relates to a fuel injection device used in an internal-combustion engine, for example.

BACKGROUND ART

As a background art in the present technical field, there is Japanese Patent Application Laid-Open No. 2005-54676 (PTL 1). In PTL 1, a method of properly stratifying the inside of a combustion chamber and improving ignition performance by converging a spray to a vicinity of a plurality of fuel spray spark plugs and forming vapor, in which fuel is atomized, around an electrode of the spark plugs is disclosed.

Also, in Japanese Patent Application Laid-Open No. 2014-1660 (PTL 2), "a fuel injection valve (10) including: a plurality of injection holes (112; 212) configured to inject fuel into a combustion chamber (22) of an internal-combustion engine (1), wherein each of the plurality of injection holes includes a guide region (114; 144; 174; 214) that lets fuel pass through and determines an amount of injected fuel and an injection direction and a diffusion region (116; 146; 176; 216) that changes the fuel passing through the guide region into a spray, and in at least one of the plurality of injection holes, a central axis (118b; 148b; 178b; 218b) of the diffusion region is in parallel with a central axis (118a; 148a; 178 a; 218a) of the guide region and is eccentrically formed on a side far from a central axis (120; 150; 180; 220) of the fuel injection valve compared to the central axis of the guide region (claim 1)" is disclosed.

CITATION LIST

Patent Literature

PTL 1: Japanese Patent Application Laid-Open No. 2005-54676

PTL 2: Japanese Patent Application Laid-Open No. 2014-1660

SUMMARY OF INVENTION

Technical Problem

In a fuel injection device of an internal-combustion engine, in order to realize low emission, a method of controlling unburned gas by promoting mixture with air by increasing system fuel pressure and atomizing a particle of injected fuel, or a method of reducing an unburned particle by controlling attachment of fuel of a fuel spray in an engine cylinder is considered.

Specifically, in a case where fuel pressure is increased for atomization, penetration force of a fuel spray is increased and a spray travel distance (hereinafter, referred to as penetration) of the injected fuel spray is increased. Thus, there is a case where attachment to an inlet valve or a cylinder internal wall surface is made and an emission amount of a harmful substance (hereinafter, referred to as PN) is increased. Thus, it is considered to provide a fuel injection device that can inject a spray of a short spray travel distance with which an emission of a harmful substance can be reduced, and a spray of a fine particle with which an emission of a harmful substance can be reduced.

For example, as disclosed in PTL 1, in a fuel injection device including a plurality of injection holes, it becomes possible to reduce a bad influence of a penetration increase by making an injection hole in a region with a small air flow small and making an injection hole in a region with a larger air flow large.

However, even in a case where an injection hole diameter is increased for a reduction of penetration, in a case where flow velocity of fuel is high due to a reason such as a pressure increase, there is a case where a flow of the fuel is separated from a wall surface of an injection hole, fuel flow velocity at an injection hole outlet becomes uneven, and a travel distance of a spray becomes long.

Also, depending on a θ angle of an injection hole, there is a case where fuel flow velocity at an injection hole inlet becomes uneven and fuel with a coarse particle is generated at non-stationary time immediately before and immediately after an injector starts injecting the fuel.

From the above reason, a disclosure about a reduction of a travel distance of a spray and a reduction of a coarse particle generated when fuel injection is stopped is not enough in these disclosed methods.

The present invention is to solve the above problem and makes it possible to provide a fuel injection device with high PN performance.

Solution to Problem

To solve the above problem, a fuel injection device of the present invention is a fuel injection device including: a valve body; and an injection hole-formed part in which a plurality of injection holes to inject fuel is formed on a leading end side of the valve body, wherein a first injection hole in which a crossing angle between a central axis of the injection hole-formed part and a first injection hole axis becomes e1 and a second injection hole in which a crossing angle between the central axis of the injection hole-formed part and a second injection hole axis becomes θ2 larger than e1 are formed in the injection hole-formed part, the first injection hole and the second injection hole are formed in such a manner that a first shortest distance between the central axis of the injection hole-formed part and a first inlet surface center of the first injection hole becomes longer than a second shortest distance between the central axis of the injection hole-formed part and a second inlet surface center of the second injection hole, and a first straight line beyond a first outlet surface in the first injection hole axis of the first injection hole is formed in such a manner as not to intersect with a second straight line beyond a second outlet surface in the second injection hole axis of the second injection hole.

Advantageous Effects of Invention

According to the above configuration of the present invention, it becomes possible to provide a fuel injection device with superior PN performance. A different configuration, function, and effect of the present invention will be described in detail in the following embodiments.

BRIEF DESCRIPTION OF DRAWINGS

FIG. 1 is a view illustrating a vertical sectional view of a fuel injection system, which has an ECU configuration with a fuel injection device of the present embodiment, and the fuel injection device.

FIG. 2 is a schematic view of a cylinder direct injection internal-combustion engine (direct-injection engine) to directly inject fuel into a cylinder of an engine.

DESCRIPTION OF EMBODIMENTS

Figure 3:
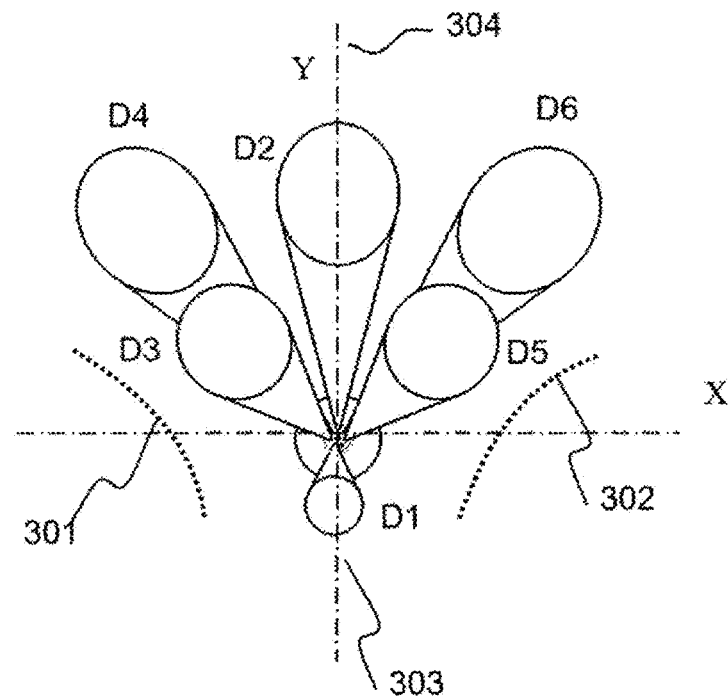
FIG. 3 is a projection view of a fuel spray injected from an orifice cup 116 of a fuel injection device 204 in a case of seen in a direction of the fuel injection device from an A-A' cross section in FIG. 2.

In the following, embodiments of the present invention will be described.

First Embodiment

First, a configuration and an operation of a fuel injection device in the first embodiment of the present invention will be described with reference to FIG. 1. FIG. is a view illustrating a vertical sectional view of a fuel injection system, which has an ECU configuration with a fuel injection device of the present embodiment, and the fuel injection device.

Injection of fuel by the fuel injection device is controlled by a width of an injection pulse transmitted from an engine control unit (ECU) 154. This injection pulse is input into a driving circuit 153 of the fuel injection device. The driving circuit 153 determines a driving current waveform based on an instruction from the ECU 154, and supplies the driving current waveform to the fuel injection device for a period based on the injection pulse. Note that there is a case where the driving circuit 153 is mounted as a component or a board integral with the ECU 154. In the present embodiment, a device in which a driving circuit 153 and the ECU 154 are integrated is referred to as a driving device 150.

Next, a configuration and a basic operation of the fuel injection device and the driving device thereof will be described. In the ECU 154, a signal indicating a state of an engine is read from various sensors, and a width of an injection pulse and injection timing to control an injection amount injected from the fuel injection device are calculated according to a working condition of an internal-combustion engine. Also, the ECU 154 includes an A/D converter and an I/O port to import signals from the various sensors. The injection pulse output from the ECU 154 is input into a driving circuit 103 of the fuel injection device through a signal line 151. The driving circuit 153 controls voltage applied to a solenoid 105 and supplies current. The ECU 154 communicates with the driving circuit 153 through a communication line 152, and can switch a driving current generated by the driving circuit 153 and can change a setting value of current and time according to pressure of fuel supplied to the fuel injection device or a working condition.

Next, a configuration and an operation of the fuel injection device will be described. The fuel injection device in FIG. 1 is a normally-closed electromagnetic fuel injection device. In a state in which a coil 105 is not energized, a valve body 114 is biased by a spring 110, is tightly in contact with a valve seat 118, and is in a closed state. In this closed state, a movable element 102 is made to be in contact with the valve body 114 tightly by a zero-length spring 112, and there is a gap between the movable element 102 and a magnetic core 107 in a state in which the valve body 114 is closed. Fuel is supplied from an upper part of the fuel injection device and the fuel is sealed by the valve seat 118. When the valve is closed, the valve body 114 is pushed in a closed direction by an action of force by the spring 110 and force by fuel pressure.

A magnetic circuit that generates electromagnetic force to open/close the valve includes a nozzle holder 101, which is a cylindrical member arranged on an outer peripheral side of the magnetic core 107 and the movable element 102, the magnetic core 107, the movable element 102, and a housing 103. When current is supplied to the coil 105, a magnetic flux is generated in the magnetic circuit, and magnetic attractive force is generated between the movable element 102, which is a movable component, and the magnetic core 107. When the magnetic attractive force that acts on the movable element 102 exceeds the sum of a load of the spring 110 and force acting on the valve body 114 due to fuel pressure, the movable element 102 moves to an upper side.

Here, the valve body 114 moves to an upper side along with the movable element 102, and moves until an upper end surface of the movable element 102 collides with a lower surface of the magnetic core 107. As a result, the valve body 114 is separated from the valve seat 118, and supplied fuel is injected from a plurality of injection holes 119. Next, after the upper end surface of the movable element 102 collides with the lower surface of the magnetic core 107, the valve body 114 is separated from the movable element 102 and overshoots. However, the valve body 114 becomes still on the movable element 102 in a certain period of time. Note that in the present embodiment, an upper direction and a lower direction are based on FIG. 1 as a matter of convenience. However, these do not necessarily correspond to an upper direction and a lower direction in a state in which an electromagnetic fuel injection device is actually attached to an internal-combustion engine.

When supply of current to the coil 105 is stopped, the magnetic flux generated in the magnetic circuit is decreased and the magnetic attractive force is decreased. When the magnetic attractive force becomes smaller than force that is combination of the load of the spring 110 and fluid force applied to the valve body 114 and the movable element 102 by the fuel pressure, the movable element 102 and the valve body 114 move to a lower side. At a time point at which the valve body 114 collides with the valve seat 118, the movable element 102 is separated from the valve body 114. On the one hand, the valve body 114 becomes still after colliding with the valve seat 118, and injection of the fuel is stopped. Note that the movable element 102 and the valve body 114 may be integrally formed as the same member or may be configured as different members and combined by a method such as welding or press-fitting.

The cylindrical orifice cup 116 having a plurality of injection holes 119 is combined to the nozzle holder 101. The orifice cup 116 includes a guide part 120 that controls a movement in a radial direction of the valve body 114. Note that the orifice cup 116 and the guide part 120 are integrally formed in FIG. 1, but may be different members. The movement in the radial direction of the valve body 114 is controlled on a downstream side by the guide part 120. Also, a movement in the radial direction of a flange part 130 of the valve body 114 is controlled on an upstream side by an inner diameter of the magnetic core 107. Accordingly, the valve body 114 is configured in such a manner of being capable of operating mainly in a valve-opened/closed direction (upper/lower direction). In a case where a movable element 102 and a valve body are the same member, a zero-length spring 112 is not necessary in a configuration, and the present invention can be applied to either structure.

Next, a configuration of the present embodiment and a problem of a fuel injection device will be described with reference to FIG. 2 to FIG. 8.

FIG. 2 is a schematic view of a cylinder direct injection internal-combustion engine (direct-injection engine) to directly inject fuel into a cylinder of an engine. Note that a state of a fuel spray in the engine cylinder immediately after fuel is injected from a leading end part of the orifice cup 116 of the fuel injection device is illustrated in FIG. 2.

Figure 4:
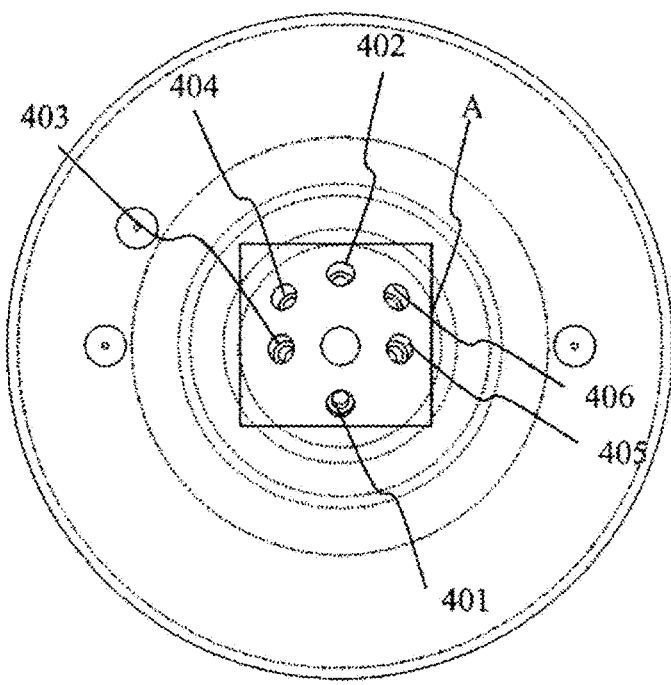
FIG. 4 is a view illustrating the orifice cup 116 seen in a leading end direction of the fuel injection device 204.

FIG. 3 is a projection view of a fuel spray injected from an orifice cup 116 of a fuel injection device 204 in a case of seen in a direction of the fuel injection device from an A-A' cross section in FIG. 2. FIG. 4 is a view illustrating the orifice cup 116 seen in a leading end direction of the fuel injection device 204.

As illustrated in FIG. 2, the direct-injection engine includes the fuel injection device 204, an inlet valve 205, a spark plug 203, an outlet valve 211, an inlet pipe 207, an outlet pipe 212, a piston 209, and a cylinder 220 including the piston 209. The fuel injection device 204 is attached to a cylindrical surface of the cylinder 220, and two inlet valves 205 are respectively attached to right and left sides with the fuel injection device 204 in the middle. In FIG. 2, as a matter of description, the inlet valves 205 will be described with reference to a drawing of being attached to an identical cross section with the fuel injection device. In FIG. 3, a positional relationship between a spray and two inlet valves 301 and 302 is illustrated.

After the inlet valves 205 are opened, air passing through the inlet pipe 207 is guided to an engine cylinder inside 208, and fuel is injected from the fuel injection device 204 along with a flow of the air flowing in. The injected fuel is carried by the flow of the air guided to the engine cylinder inside 208, is mixed with the air, and forms vapor. Subsequently, at timing at which the piston 209 becomes close to a top dead point, the vapor is ignited by the spark plug 203 and burned, whereby driving force is acquired.

The fuel injection device 204 is attached to an engine cylinder internal wall surface 210 close to the inlet valves 205 in order to promote mixture of the inflow air and the fuel. Also, with respect to an attachment angle of the fuel injection device 204, attachment is performed in such a manner that a central axis 201 of the fuel injection device 204 becomes 5 to 30 deg. to a horizontal axis 202 in a cylinder of the engine in order to prevent interference with the inlet valves 205. Since a pressure loss of the inlet pipe is increased when the inlet valves 205 become high, it is necessary to make an angle of the inlet pipe small. The attachment angle of the fuel injection device 204 is determined according to an angle of the inlet pipe 207. Thus, in order to prevent interference with the inlet pipe 207, arrangement is made in such a manner that an angle of the central axis of the fuel injection device 204 with respect to the horizontal axis 202 in the engine cylinder becomes small.

A fuel spray injected from the fuel injection device 204 is formed in a manner of D1 to D6 in FIG. 3.

The one first spray D1 is formed in such a manner as to be most directed to a leading end side of the spark plug 203 among the plurality of injection holes. The second spray D2 is formed in such a manner as to be most directed to an upper surface side of the piston 209 among the plurality of injection holes. The third sprays D3 and D5 are injected in a direction closest to the inlet valves 301 and 302 among the plurality of injection holes and are formed in such a manner that the spray D3 is inclined to a side of one inlet valve 301 and the spray D5 is inclined to a side of the other inlet valve 302. The fourth sprays D4 and D6 are formed in such a manner as to be second most directed to the upper surface side of the piston 209 and are formed in such a manner that the spray D4 moves toward one outer diameter side of the upper surface of the piston 209 and the spray D6 moves toward the other outer diameter side of the upper surface of the piston 209.

Note that in FIG. 4, a first injection hole 401 corresponds to the spray D1, a second injection hole 402 corresponds to the spray D2, a third injection hole 403 corresponds to the spray D3, a fourth injection hole 404 corresponds to the spray D4, a fifth injection hole 405 corresponds to the spray D5, and a sixth injection hole 406 corresponds to the spray D6.

As a matter of an attachment position of the fuel injection device 204 and an attachment position of the spark plug 203, an angle of a central axis 206 of the first spray D1 formed to be most directed to the leading end side of the spark plug 203 is around 0 to ten and several degrees with respect to a central axis 201 of the fuel injection device 204.

Figure 5:
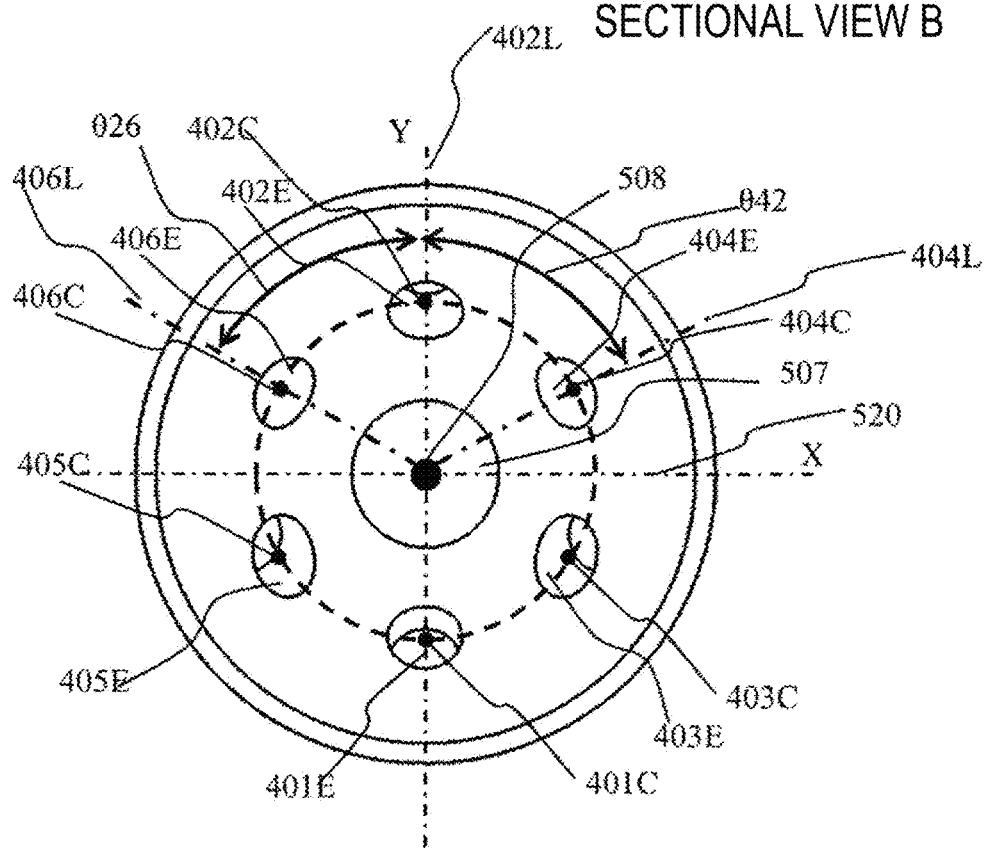
FIG. 5 is a view illustrating the orifice cup 116 in an opposite direction of FIG. 4 (upstream direction).

Next, a configuration of the orifice cup 116 of the fuel injection device 204 will be described with reference to FIGS. 5, 6, 7, and 8. FIG. 5 is a view illustrating the orifice cup 116 seen in an opposite direction of FIG. 4 (upstream direction). Injection hole inlet surfaces 401E to 406E respectively indicate inlet surfaces (upstream side surface) of the first injection hole to the sixth injection hole (401 to 406) in FIG. 4. Centers (center of gravity) of the injection hole inlet surfaces 401E to 406E are respectively indicated by injection hole inlet surface centers 401C to 406C.

Figure 6:
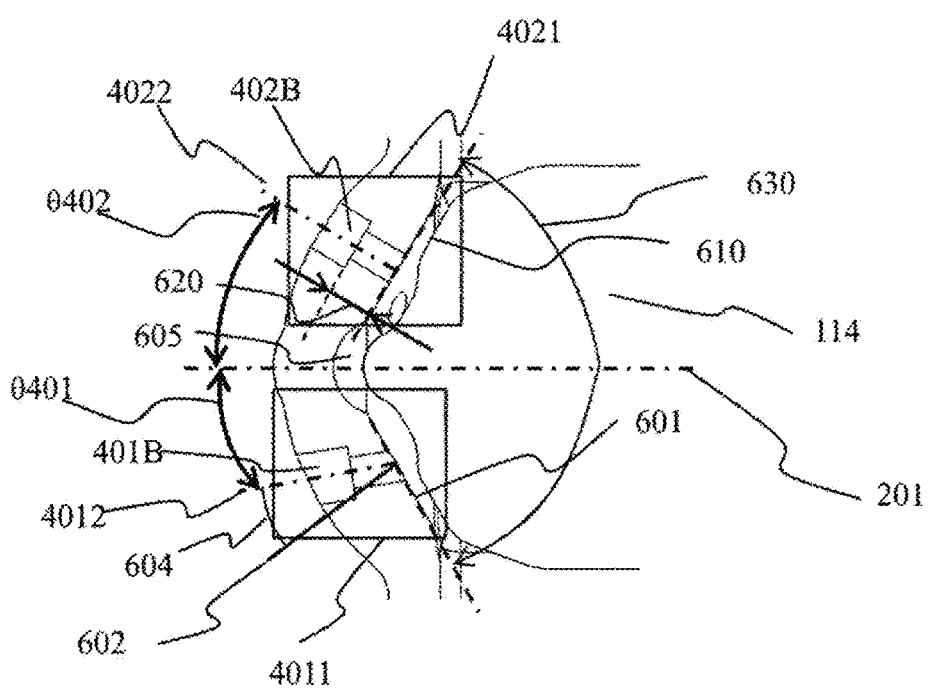
FIG. 6 is a sectional-enlarged view of a cross section B-B' passing through a second injection hole 502 that forms a second spray D2 and a first injection hole 501 that forms a first spray D1 in FIG. 5.
Figure 7:
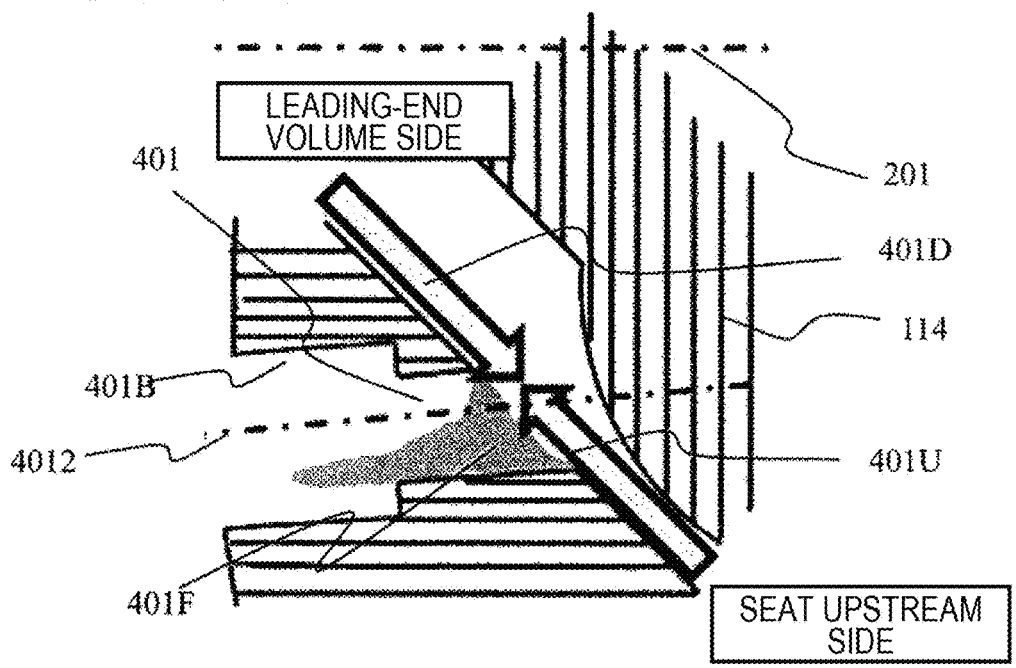
FIG. 7 is an enlarged view of a frame 4011 in FIG. 6.
Figure 8:
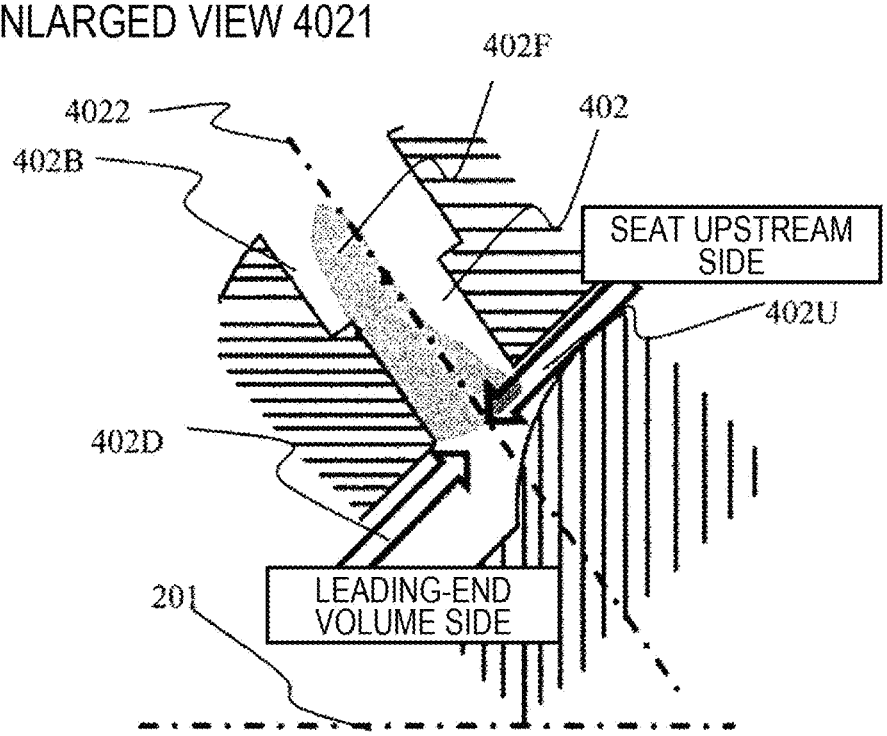
FIG. 8 is an enlarged view of a frame 4021 in FIG. 6.

FIG. 6 is a sectional-enlarged view of a cross section B-B' passing through a second injection hole 502 that forms a second spray D2 and a first injection hole 501 that forms a first spray D1 in FIG. 5. FIGS. 7 and 8 are enlarged views of frames 4011 and 4021 in FIG. 6 and are views respectively illustrating a flow of fuel in the first injection hole 401 and the second injection hole 402.

A seat surface 601 that forms the valve seat 118 to be in contact with the valve body 114 and to seal fuel has a substantially conic shape and seals fuel by being in contact with a spherical surface part 610 of the valve body 114. The injection holes include the first injection hole to the sixth injection hole (401 to 406) that form sprays D1 to D6 and that have injection hole center points 401C, 402C, 403C, 404C, 405C, and 406C on P.C.D. having an orifice cup center point 508. At leading end parts (downstream side) of injection holes 401 to 406, counterbore parts 401B, 402B, 403B, 404B, 405B, and 406B having a larger inner diameter than the injection holes are formed. A straight line connecting the injection hole center point 402C of the injection hole inlet surface 402E of the second injection hole 402 and the orifice cup center point 508 is defined as 402L. Similarly, straight lines connecting the inlet surface centers of the injection holes and the orifice cup center point 508 are respectively defined as 401L, 403L, 404L, 405L, and 406L. For example, a crossing angle θ26 between the straight lines 402L and 406L formed by the adjacent second injection hole 402 and sixth injection hole 406 and a crossing angle θ42 between the straight lines 404L and 402L formed by the adjacent fourth injection hole 404 and second injection hole 402 are arranged at an even angle.

Here, as illustrated in FIG. 6, a crossing angle θ401 between the central axis 201 of the fuel injection device 204 and an injection hole axis 4012 of the first injection hole becomes smaller than a crossing angle θ402 between the central axis 201 and an injection hole axis 4022 of the second injection hole. Thus, as illustrated in FIG. 7, since the crossing angle θ401 is small in the first injection hole 401, a flow 401D of fuel from a downstream side on a side of a suction chamber (leading-end volume) becomes dominant to a flow 401U of fuel from an upstream side in an injection hole inlet, and inflow from the downstream side becomes large. Thus, a flow of fuel is in a manner indicated by 401F and dribbling of the fuel is generated.

On the one hand, as illustrated in FIG. 8, since a crossing angle θ402 is large in the second injection hole 402, a flow 402U of fuel from the upstream side becomes dominant to a flow 402D of fuel from the downstream side on the side of the suction chamber (leading-end volume) in the injection hole inlet, and inflow from the upstream side becomes large. Thus, a flow of the fuel is in a manner indicated by 402F, whereby a separation region becomes large and penetration becomes long.

In a case where an injection hole angle between a line 602 in a normal direction of the seat surface 601 and a central axis of each injection hole is large, fuel is separated at an inlet of the injection hole and flows in a manner of being biased to a surface on the opposite side of the separation of the fuel in the injection hole.

For example, in the injection hole 501, an angle formed by the line 602 in the normal direction of the seat surface and the central axis 4012 of the injection hole 401 becomes an injection hole angle 604, and is large compared to the other injection holes as a matter of attachment of the fuel injection device 204. Thus, in a case where an angle between the injection holes is even as described above, fuel flowing from a volume 605 at the leading end of the valve body 114 is separated from a wall surface on an injection hole downstream side at an injection hole inlet and flows along a wall surface side on a seat side, whereby a flow velocity distribution of a fuel spray at an injection hole outlet becomes uneven and a maximum value of a velocity vector in an injection hole central axis direction at the injection hole outlet becomes large.

A case where the injection holes are not filled with fuel due to separation of the fuel substantially corresponds to an effect of a decrease in an inner diameter of the injection holes. Thus, when a flow rate in a unit time of fuel injected from an injection hole is Qo, flow velocity of the fuel injected from the injection hole is $v_o$, and a cross section area of the injection hole is $D_o$, flow velocity $v_o$ can be calculated by a relationship in an expression (1).

$$v_o = Qo/D_o \quad (1)$$

From the expression (1), the flow velocity $v_o$ becomes high as an injection hole diameter $D_o$ becomes small. As a result, since penetration force of a spray becomes large, a travel distance (penetration) of a fuel spray becomes long. When penetration becomes long, fuel attachment of the fuel spray to the cylinder internal wall surface 210, the piston 209, and the outlet valve 211 is increased. Since the fuel attached to the cylinder internal wall surface 210 or the piston 209 is less likely to be vaporized, there is a case where PN is increased.

Specifically, as described above, since the injection hole angle 604 of the injection hole 401 is large, there is a problem that penetration is likely to become long and attachment to the cylinder internal wall surface 210 is likely to be generated.

Since a fuel path formed between the valve body 114 and the valve seat 118 becomes narrow immediately before and immediately after injection of fuel is stopped, a flow becomes unstable. Thus, inflow of fuel into an injection hole provided in the valve seat becomes unstable, and a diameter of a particle of injected fuel becomes coarse. When this fuel including a coarse particle is injected, fuel is less likely to be vaporized. Thus, there is a case where PN is increased.

Figure 9:
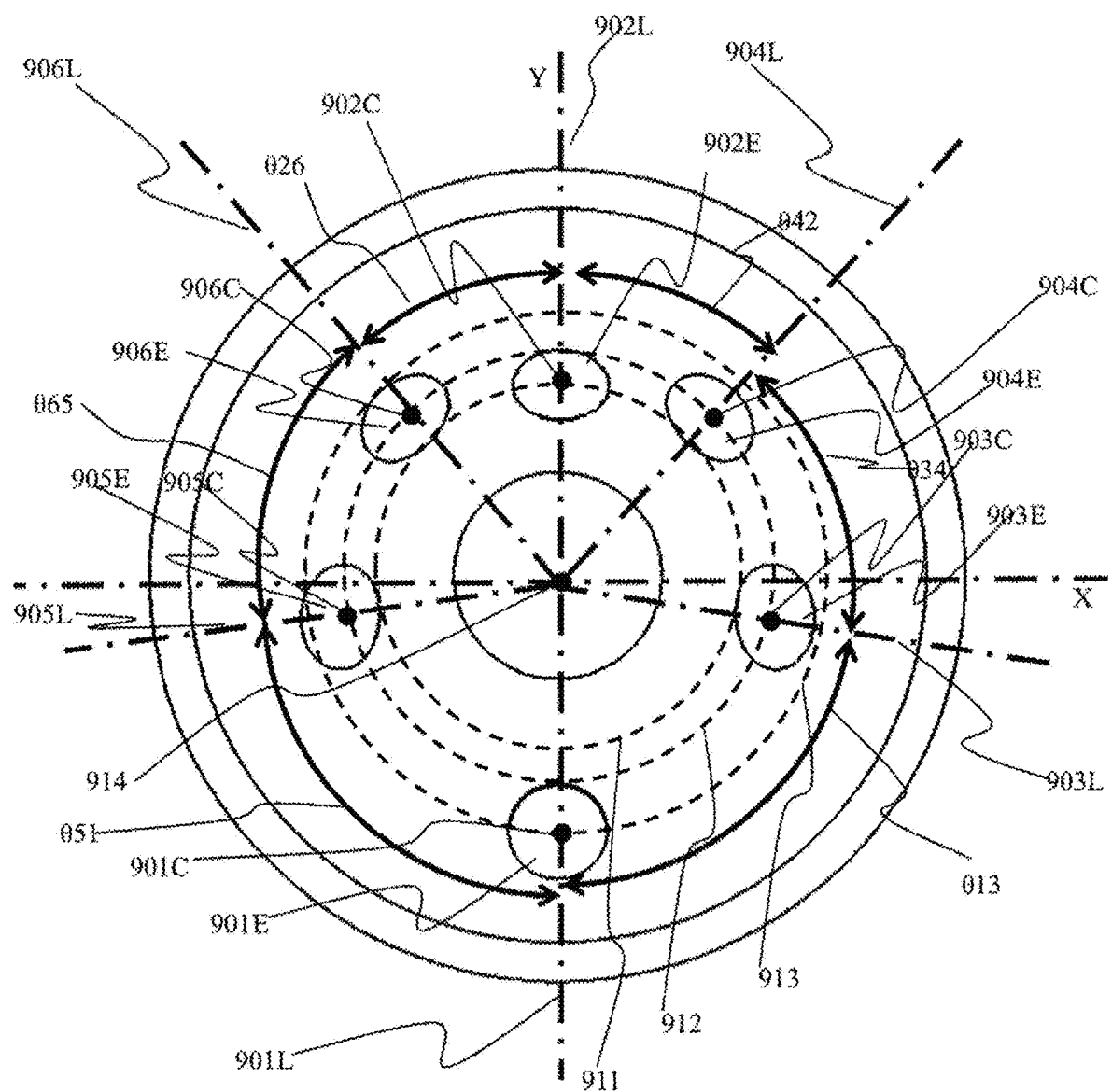
FIG. 9 is a view illustrating the orifice cup 116 in the opposite direction of FIG. 4 (upstream direction).
Figure 10:
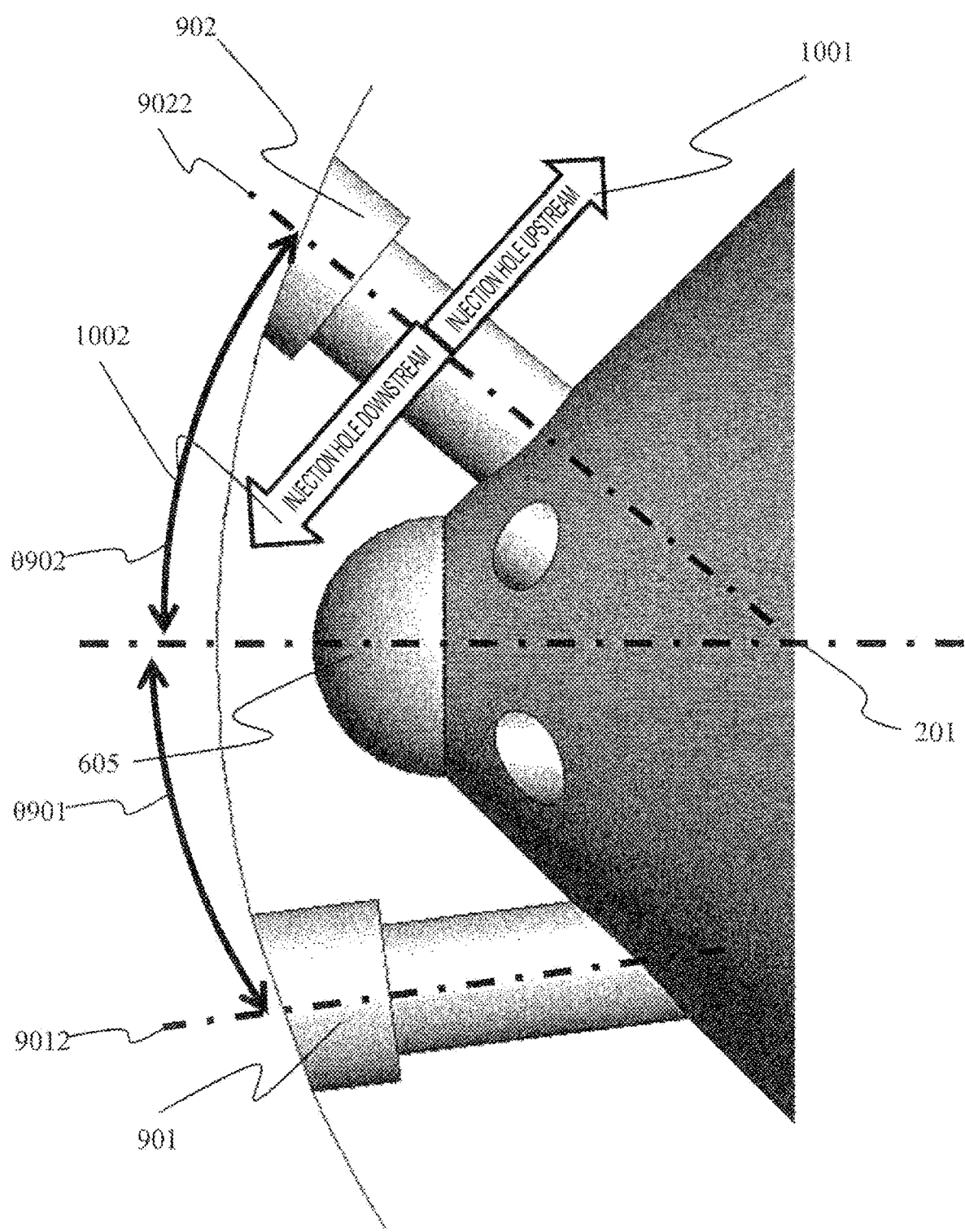
FIG. 10 is a sectional view in a valve body axis direction along a Y-axis in FIG. 9 and illustrates a sectional view of a second injection hole and a first injection hole from the top.

Next, a configuration of the present embodiment will be described with reference to FIG. 9 and FIG. 10. FIG. 9 is a view illustrating the orifice cup 116 seen in the opposite direction of FIG. 4 (upstream direction). FIG. 10 is a sectional view in a valve body axis direction along a Y-axis in FIG. 9 and is a sectional view of a second injection hole and a first injection hole from the top. The fuel injection device 204 of the present embodiment includes a first injection hole 901, a second injection hole 902, a third injection hole 903, a fourth injection hole 904, a fifth injection hole 905, and a sixth injection hole 906. Here, as illustrated in FIG. 10, a crossing angle θ901 between a central axis 201 of the fuel injection device 204 and an injection hole axis 9012 of the first injection hole 901 becomes smaller than a crossing angle θ902 between the central axis 201 and an injection hole axis 9022 of the second injection hole 902. Note that it is configured that the crossing angle θ902 becomes larger than crossing angles (θ903, θ904, θ905, and θ906) between injection hole axes (9032, 9042, 9052, and 9062) of the other injection holes (903, 904, 905, and 906) (not illustrated) and the central axis 201 and that injection hole angles θ of the other injection holes become larger than that of the fourth injection hole 904.

In FIG. 7, the crossing angle θ401 is smaller than the others and flow velocity on the downstream side (flow flowing from suction chamber) becomes dominant. As a result, the inflow from the downstream side (suction chamber) becomes large and dribbling is generated.

According to a configuration of the first embodiment, a pitch circle diameter (P.C.D.) 911 of the second injection hole 902 with a large injection hole angle θ is made smaller than P.C.D. 912 and 913 of the other injection holes. Note that as illustrated in FIG. 9, P.C.D. is defined by a distance between a center 914 of the orifice cup (injection hole-formed part) and a center (901C to 906C) of an inlet surface (901E to 906E) of each injection hole (901 to 906) when seen in an upstream side in the valve body axis direction. Accordingly, a distance between the center 914 of the orifice cup and the center 902C of the injection hole inlet 902E seen from an inflow inlet of fuel can be made shorter than corresponding distances of the other injection holes (901, and 903 to 906). Thus, it becomes possible to separate a seat part vicinity part of the injection hole inlet 902, in which flow velocity becomes high as illustrated in FIG. 8, from the seat part (upstream side) and to make it easy to receive an influence of a flow from the volume 605 at the leading end.

As a result, it becomes possible to reduce an influence of a flow from the seat part, to reduce separation at an injection hole inlet, and to control flow velocity on an outlet surface of the injection hole compared to the configuration in FIG. 5.

Also, in FIG. 8, the crossing angle θ402 is large compared to the others and flow velocity on the upstream side becomes dominant.

As a result, a separation region becomes large and penetration becomes long. According to a configuration of the present embodiment, flowability from the volume 605 at the leading end is improved as described above. Thus, inflow at an injection hole inlet becomes stable.

Also, P.C.D. 913 of the injection hole inlet surface 901E of the first injection hole 901 having a small crossing angle between the central axis 201 and the injection hole axis is made larger than P.C.D. 911 and 912 of the other injection holes (902 to 906). That is, a distance between the center 914 of the orifice cup and the center 901C of the injection hole inlet surface 901E seen from the inflow inlet of fuel is made longer than corresponding distances of the other injection holes (902 to 906). Accordingly, it becomes possible to separate a leading end side part (downstream side part) of the injection hole inlet 902 from a side of the volume 605 at the leading end and to make it easy to receive a flow from the seat part. As a result, compared to the configuration in FIG. 5, it becomes possible to reduce an influence of a flow from the volume 605 at the leading end, to reduce separation at an injection hole inlet, and to control flow velocity on an outlet surface of an injection hole outlet surface of an injection hole. Accordingly, a flow at the injection hole outlet also becomes stable.

When seen in the inflow inlet of fuel, that is, seen in an upstream direction of the valve body axis in a manner of FIG. 9, injection hole inlet surfaces (903E, 904E, 905E, and 906E) are formed in such a manner that the other injection holes (903 to 906) have P.C.D 912 between a distance between the center 902 of the injection hole inlet surface 902E of the second injection hole 902 and the center 914 of the orifice cup (P.C.D 911) and a distance between the center 901 of the injection hole inlet surface 901E of the first injection hole 901 and the center 914 of the orifice cup (P.C.D 913).

Also, as crossing angles (θ901, θ902, θ903, θ904, θ905, and θ906) between injection hole axes (9012, 9022, 9032, 9042, 9052, and 9062) of the injection holes (901, 902, 903, 904, 905, and 906) and the central axis 201 become large, smaller P.C.D is set in the above manner. Accordingly, it becomes also possible to stabilize inflow at injection hole inlets of the other injection holes.

Also, a distance between injection holes varies among the injection holes by a change in a distance from injection hole centers, which are seen from the inflow inlet of fuel, to the center 914 of the orifice cup of the injection holes. Thus, optimization of a distance between the injection holes becomes necessary.

A crossing angle θ26 between straight lines 902L and 906L formed by the adjacent second injection hole 902 and sixth injection hole 906, and a crossing angle θ42 between straight lines 904L and 902L formed by the adjacent fourth injection hole 904 and second injection hole 902 are arranged at an even angle. On the one hand, a crossing angle θ51 between straight lines 901L and 905L formed by the adjacent first injection hole 901 and fifth injection hole 905, and a crossing angle θ13 between straight lines 901L and 903L formed by the adjacent first injection hole 901 and third injection hole 903 are arranged at an even angle. Here, the crossing angle θ26 and the crossing angle θ42 are set to be smaller than the crossing angle θ51 and the crossing angle θ13.

In such a manner, when the crossing angle θ26 and the crossing angle θ42 are made small, a distance between injection holes of the second injection hole 902 and the sixth injection hole 906, and the second injection hole 902 and the fourth injection hole 904 becomes short. When a distance between the injection holes becomes short, fluid flowing into an injection hole inlet becomes likely to interfere with the mutual injection holes and becomes less likely to flow in. Thus, flow velocity from an injection hole upstream side 1001 becomes small. As a result, it becomes possible to control penetration and to reduce PN.

Also, since inflow from a side of the volume 605 at the leading end becomes stable, coarse particle generation can be controlled.

Note that a distance between injection holes in the present embodiment is defined as a length of a straight line connecting the centers (901C to 906C) of the inlet surfaces (901E to 906E) of the injection holes (901 to 906) since depending on fluid resistance on the upstream side 1001 of the injection holes and in the injection holes.

Also, it is preferable that the crossing angle θ51 between the straight lines 901L and 905L formed by the first injection hole 901 and the fifth injection hole 905 and the crossing angle θ13 between the straight lines 901L and 903L formed by the first injection hole 901 and the third injection hole 903 are configured to be larger than any of crossing angles (θ65, θ26, θ42, and θ34) formed by the other injection holes. In such a manner, it is possible to increase a distance between the injection holes by making the crossing angles (θ51 and θ13) formed by the three injection hole centers (901C, 903C, and 905C) and the center 914 large. When the distance between the injection holes becomes long, fluid flowing into an injection hole inlet becomes less likely to receive interference from the other injection holes and more easily flows in. Thus, flow velocity from an injection hole downstream side 1002 becomes low and an injection hole upstream side 1001 becomes stable, whereby it becomes possible to control penetration and to reduce PN.

As described above, the fuel injection device of the present embodiment includes the valve body 114, and the injection hole-formed part (orifice cup) in which a plurality of injection holes (901 to 906) to inject fuel is formed on a leading end side of the valve body 114. Then, in the injection hole-formed part, the first injection hole 901 in which a crossing angle between the central axis 201 of the injection hole-formed part and the first injection hole axis 9012 becomes θ1 (θ901), and the second injection hole 902 in which a crossing angle between the central axis 201 of the injection hole-formed part and the second injection hole axis 9022 becomes θ2 (θ902) larger than θ1 (θ901) are formed. Then, the first injection hole 901 and the second injection hole 902 are formed in such a manner that a first shortest distance between the central axis 201 of the injection hole-formed part and the first inlet surface center 901C of the first injection hole 901 becomes longer than a second shortest distance between the central axis 201 of the injection hole-formed part and the second inlet surface center 902C of the second injection hole 902. Here, a shortest distance is a distance between the center 914 in FIG. 9 and a center of each injection hole and is formed in a horizontal direction. Then, a first straight line beyond a first outlet surface in the first injection hole axis 9012 of the first injection hole 901 is formed in such a manner as not to intersect with a second straight line beyond a second outlet surface in the second injection hole axis 9022 of the second injection hole 902. That is, configuration is made in such a manner that intersection with each other is not made beyond injection hole outlets.

This plurality of injection holes (901 to 906) is formed in such a manner that a distance L1 between the first inlet surface center 901C of the first injection hole 901 and an inlet surface center (903C or 905C) of an injection hole (903 or 905) arranged adjacently in an outer peripheral direction of the first injection hole 901 becomes longer than a distance L2 between the second inlet surface center 902C of the second injection hole 902 and an inlet surface center (904C or 906C) of an injection hole (904 or 906) arranged adjacently in an outer peripheral direction of the second injection hole.

Also, the plurality of injection holes is formed in such a manner that a crossing angle β1 (θ13 or θ51) between the straight line 901L connecting the first inlet surface center 901C of the first injection hole 901 and the center 914 of the injection hole-formed part and a straight line (903L or 905L) connecting the inlet surface center (903C or 905C) of the injection hole (903 or 905) arranged adjacently in the outer peripheral direction of the first injection hole 901 and the center 914 of the injection hole-formed part becomes larger than a crossing angle β2 (θ26 or θ42) between the straight line 902L connecting the second inlet surface center 902C of the second injection hole 902 and the center 914 of the injection hole-formed part and a straight line (904L or 906L) connecting the inlet surface center (904C or 906C) of the injection hole (904 or 906) arranged adjacently in the outer peripheral direction of the second injection hole 902 and the center 914 of the injection hole-formed part.

Also, it is preferable that the first straight line beyond the first outlet surface in the first injection hole axis 9012 of the first injection hole 901 is formed in such a manner as not to intersect with the second straight line beyond the second outlet surface in the second injection hole axis 9022 of the second injection hole 902. Also, it is preferable that the above-described crossing angle θ1 (θ901) of the first injection hole 901 is configured to be the smallest compared to crossing angles (θ902 to θ906) between injection hole axes (9022 to 9062) of the other plurality of injection holes (902 to 906) and the central axis 201 of the injection hole-formed part.

The first injection hole 901 and the second injection hole 902 are arranged on an outer side in a radial direction and are arranged in substantially symmetric positions with respect to the center 914 of the injection hole-formed part when the injection hole-formed part is seen in a central axis direction (201). Also, the first injection hole 901 among the plurality of injection holes (901 to 906) is arranged in such a manner as to be most directed to a leading end part of the spark plug 203 in a state in which the fuel injection device 204 is attached to an engine. Also, a third injection hole 903 in which a crossing angle θ903 between the central axis 201 of the injection hole-formed part and a third injection hole axis 9032 becomes θ3 (θ903) larger than θ1 (θ901) and smaller than θ2 (θ902) is formed in the injection hole-formed part. Then, it is preferable that the first injection hole 901, the second injection hole 902, and the third injection hole 903 are formed in such a manner that a third shortest distance between the central axis 201 of the injection hole-formed part and the third inlet surface center 903C of the third injection hole 903 becomes shorter than the first shortest distance and longer than the second shortest distance.

Also, it is preferable that a third straight line beyond a third outlet surface in the third injection hole axis 9032 of the third injection hole 903 is formed in such a manner as not to intersect with any of the first straight line beyond the first outlet surface in the first injection hole axis 9012 of the first injection hole 901 and the second straight line beyond the second outlet surface in the second injection hole axis 9022 of the second injection hole 902.

Also, the first injection hole 901 and the second injection hole (903 or 905) are arranged on the outer side in the radial direction and are arranged side by side in the outer peripheral direction when the injection hole-formed part is seen in the central axis direction. In this case, a third injection hole (904 or 906) which is arranged on the opposite side of the second injection hole 902 (903 or 905) with respect to the first injection hole 901 when the injection hole-formed part is seen in the central axis direction and in which a crossing angle (θ904 or θ906) between the central axis 201 of the injection hole-formed part and the third injection hole axis (9042 or 9062) becomes θ3 (θ904 or θ906) larger than θ1 (θ901) is formed in the injection hole-formed part. Then, it is preferable that a third straight line beyond a third outlet surface in the third injection hole axis (9042 or 9062) of the third injection hole (904 or 906) is formed in such a manner as not to intersect with the first straight line (first straight line of 901) and the second straight line (third straight line or fifth straight line of 903 or 905). Note that in this case, it is preferable that a crossing angle (θ903 or θ905) and the crossing angle θ3 (θ904 or θ906) are identical.

Also, the first injection hole 901, the second injection hole 902, and the third injection hole 903 are arranged on the outer side in the radial direction and are arranged side by side in order of the second injection hole (903 or 905), the first injection hole 901, and the third injection hole (905 or 903) in the outer peripheral direction when the injection hole-formed part is seen in the central axis direction.

With such a configuration, by increasing an influence of fuel flowing from a gap between the valve body and the valve seat, which gap is formed from the center of the orifice cup to an injection hole, on an injection hole angle θ at which fuel flowing from a seat side of the valve body becomes dominant, it becomes possible to equalize fuel flow velocity at an injection hole outlet and to reduce penetration. Also, it becomes possible to equalize fuel flow velocity at an injection hole outlet and to reduce penetration by increasing an influence of the fuel flowing from the seat side of the valve body on a changed angle θ at which the fuel flowing from the gap between the valve body and the valve seat which gap is formed from the center of the orifice cup to the injection hole becomes dominant. Also, it becomes possible to stabilize fuel inflow at stopping of injection and to reduce a coarse particle by changing, by inflow, a distance from the center of the orifice cup to an injection hole center seen from an inflow inlet of fuel. As a result, reduction of PN becomes possible by attachment of fuel to a cylinder internal wall surface and atomization of the fuel.

Second Embodiment

Figure 11:
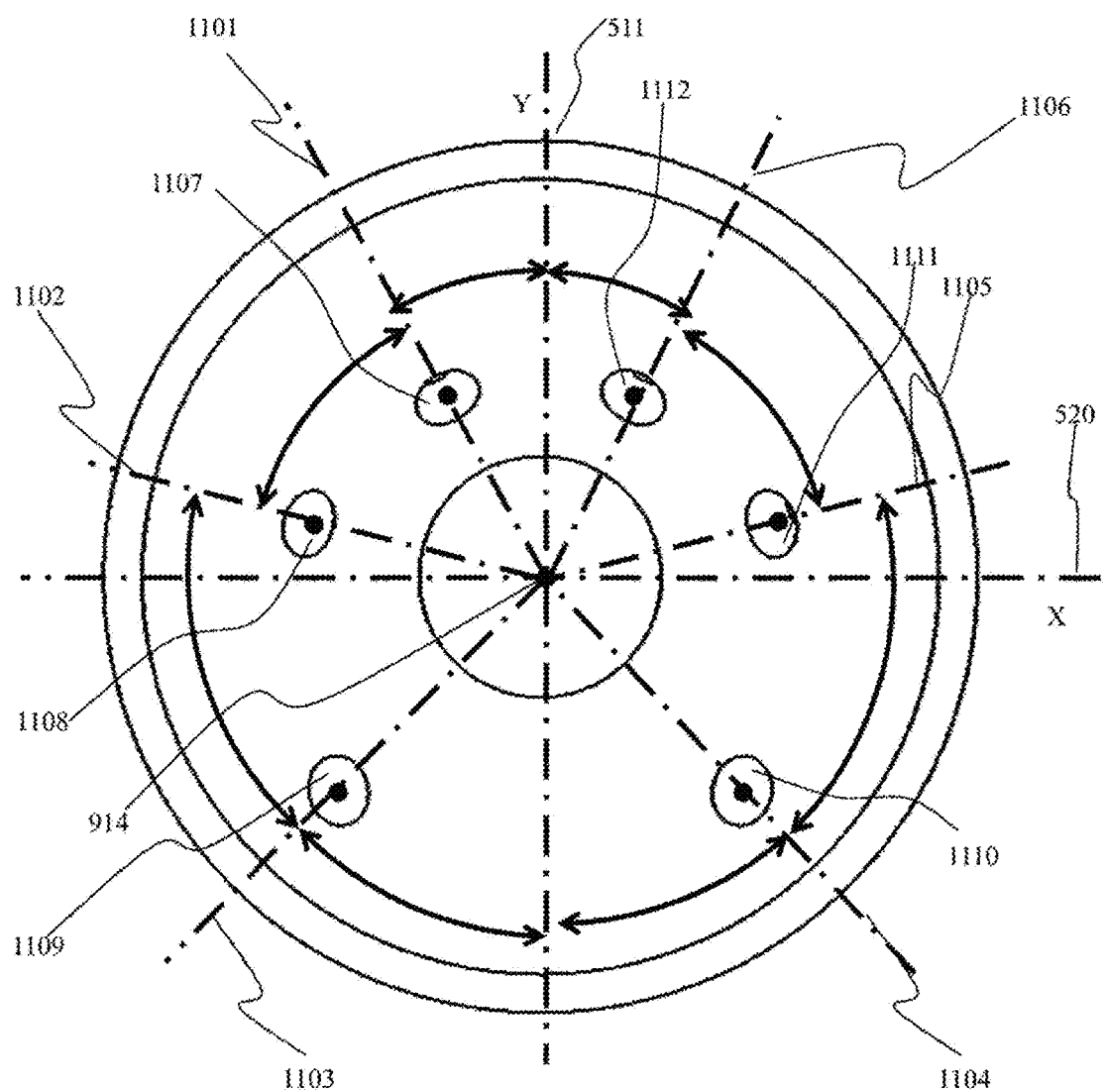
FIG. 11 is a view illustrating an orifice cup 116 in an upstream direction in a second embodiment.

The second embodiment according to the present invention will be described with reference to FIG. 11. FIG. 11 is an enlarged view of an injection hole arrangement seen from a fuel inlet side of an orifice cup 116 in the present embodiment.

A difference between the present embodiment and the first embodiment is a point that there is a plurality of injection holes having the smallest injection hole angle θ. An angle formed by injection holes 1109 and 1110 having the smallest injection hole angle θ and a center 914 of an orifice cup is made small. Accordingly, since interference between the injection holes is increased, a flow rate of inflow from an injection hole downstream side 1002 becomes high and flow velocity becomes high. Thus, separation generated by inflow on an injection hole upstream side 1001 in is reduced, and penetration can be controlled. Also, an angle formed by at least one injection hole that has the largest injection hole angle θ and that is a second injection hole 1108 and a fifth injection hole 1111 here, a center 914 of an orifice cup, and an adjacent injection hole is made to be large. Accordingly, since interference between the injection holes is attenuated, a flow rate of inflow from the injection hole downstream side 1002 becomes low and flow velocity becomes low. Thus, separation generated by inflow on the injection hole downstream side 1002 in is reduced, and penetration can be controlled.

Third Embodiment

Figure 12:
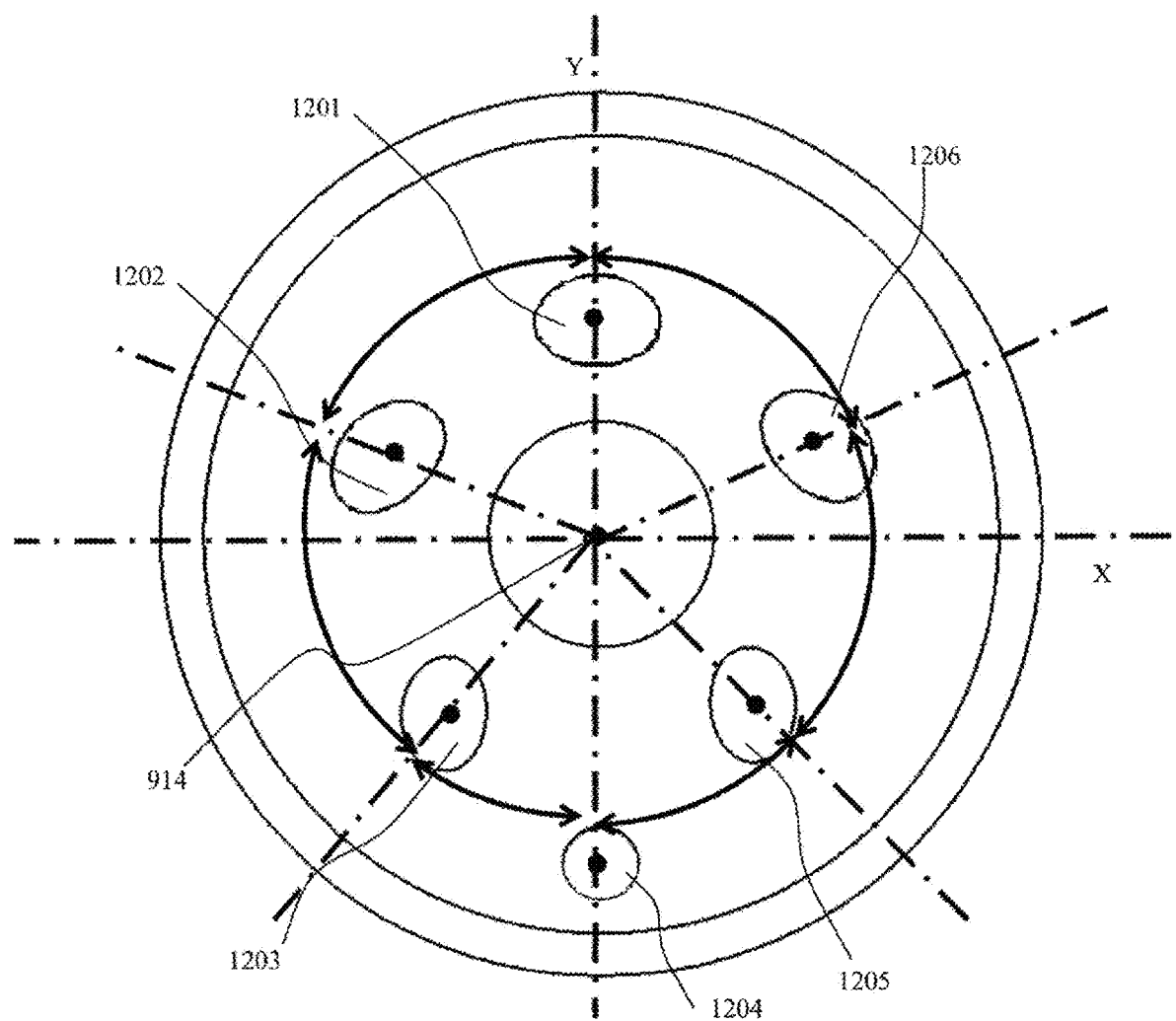
FIG. 12 is a view illustrating an orifice cup 116 in an upstream direction in a third embodiment.

The third embodiment according to the present invention will be described with reference to FIG. 12. The drawing is an enlarged view of an injection hole arrangement seen from a fuel inlet side of an orifice cup 116 in the third embodiment.

A difference between the third embodiment and the first embodiment is a point that a different hole-diameter is configured. As illustrated in FIG. 12, an angle formed by an injection hole and an orifice cup center point 914 is made to be large with respect to injection holes 1202 and 1206 having the largest diameter. Contrarily, an angle is made to be small with respect to an injection hole 1204 having the smallest diameter. With this configuration, in addition to controlling of the penetration and the coarse particle diameter, it becomes possible to design an intended flow rate distribution by adjusting a flow rate of inflow at an injection hole inlet.

Fourth Embodiment

Figure 13:
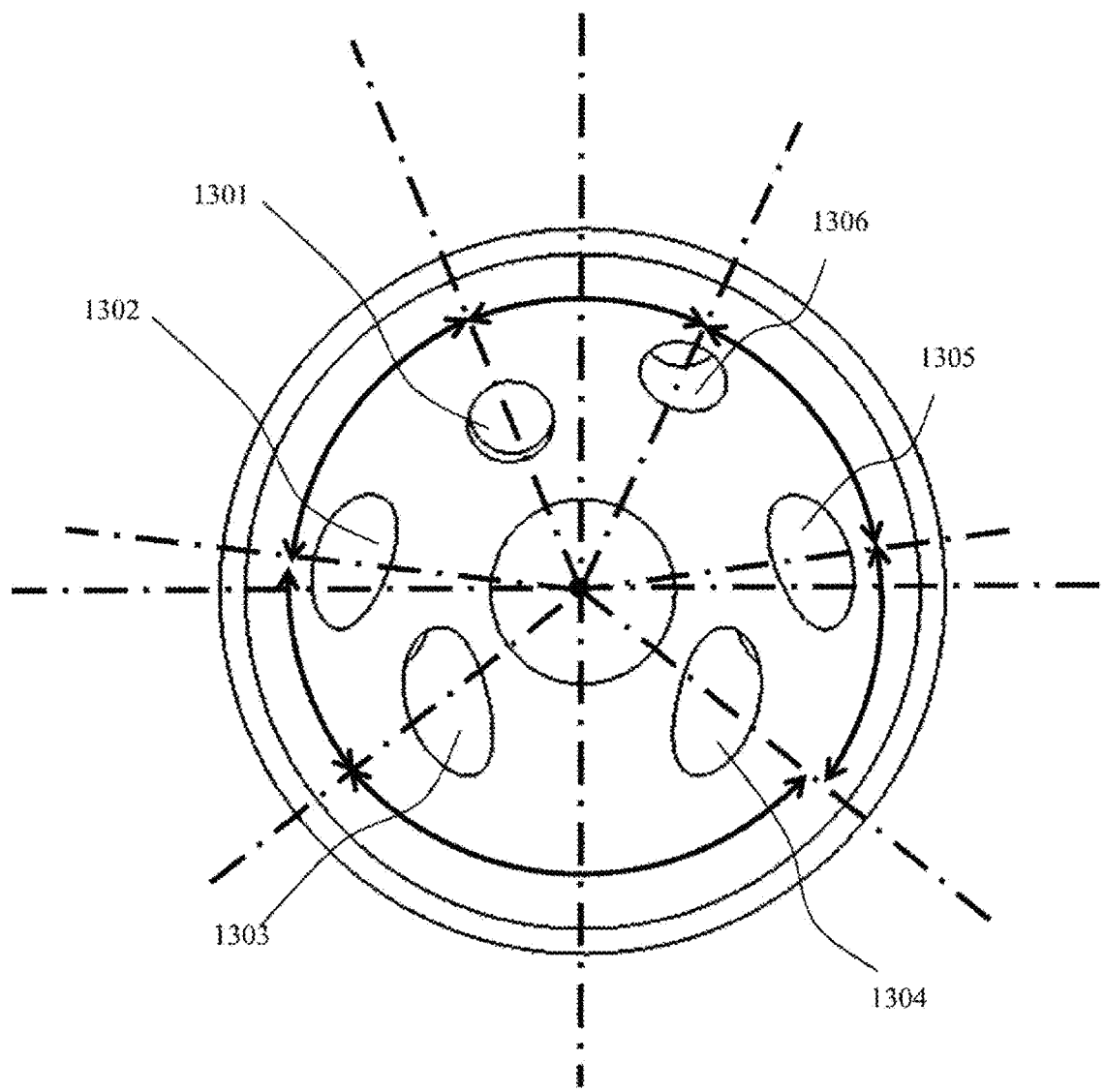
FIG. 13 is a view illustrating an orifice cup 116 in an upstream direction in a fourth embodiment.

The fourth embodiment according to the present invention will be described with reference to FIG. 13. FIG. is an enlarged view of an injection hole arrangement seen from a fuel inlet side of an orifice cup 116 in the present embodiment.

A difference between the fourth embodiment and the first embodiment is a point that it is configured to aim at sprays D1 and D4 existing on a Y-axis 304 by adjacent first injection hole 1301 and sixth injection hole 1306. An angle formed by the first injection hole 1301, the sixth injection hole 1306, and a center 914 of the orifice cup is made small. With respect to the other injection holes, an angle formed by an injection hole and a center point is made to be large for an injection hole a flow rate of which is intended to be made high according to an aimed flow rate distribution ratio, and an angle formed by an injection hole and the center 914 of the orifice cup is made to be small for an injection hole a flow rate of which is intended to be made low.

In a case where the injection hole a flow rate of which is intended to be made low and the injection hole a flow rate of which is intended to be made high are adjacent to each other, an angle formed by an injection hole on the other side of the injection hole, a flow rate of which is intended to be made high, and the center point is made to be large and the injection hole a flow rate of which is intended to be made low is configured in an opposite manner. Accordingly, it becomes possible to design an aimed flow rate distribution by adjusting a flow rate of inflow at an injection hole inlet in addition to controlling of the penetration and the coarse particle diameter described above.

REFERENCE SIGNS LIST

116 orifice cup
901-906 first injection hole to sixth injection hole
9012-9062 first injection hole axis to sixth injection hole axis

The invention claimed is:

1. A fuel injection device comprising: a valve body; and an injection hole-formed part in which a plurality of injection holes to inject fuel is formed on a leading end side of the valve body,
    wherein in the injection hole-formed part, a first injection hole in which a crossing angle between a central axis of the injection hole-formed part and a first injection hole axis becomes $\theta 1$, and a second injection hole in which a crossing angle between the central axis of the injection hole-formed part and a second injection hole axis becomes $\theta 2$ larger than $\theta 1$ are formed,
    the first injection hole and the second injection hole are formed in such a manner that a first shortest distance between the central axis of the injection hole-formed part and a first inlet surface center of the first injection hole becomes longer than a second shortest distance between the central axis of the injection hole-formed part and a second inlet surface center of the second injection hole, and
    a first straight line beyond a first outlet surface in the first injection hole axis of the first injection hole is formed in such a manner as not to intersect with a second straight line beyond a second outlet surface in the second injection hole axis of the second injection hole,
    wherein in the injection hole-formed part, a third injection hole in which a crossing angle between the central axis of the injection hole-formed part and a third injection hole axis becomes $\theta 3$ larger than $\theta 1$ and smaller than $\theta 2$ is formed, and
    the first injection hole, the second injection hole, and the third injection hole are formed in such a manner that a third shortest distance between the central axis of the injection hole-formed part and a third inlet surface center of the third injection hole becomes shorter than the first shortest distance and longer than the second shortest distance.

2. The fuel injection device according to claim 1, wherein the crossing angle $\theta 1$ of the first injection hole is configured in such a manner as to be the smallest compared to crossing angles between injection hole axes of the other plurality of injection holes and the central axis of the injection hole-formed part.

3. The fuel injection device according to claim 1, wherein the first injection hole and the second injection hole are arranged on an outer side in a radial direction and are arranged in substantially symmetrical positions with respect to the center of the injection hole-formed part when the injection hole-formed part is seen in a central axis direction.

4. The fuel injection device according to claim 1, wherein the first injection hole among the plurality of injection holes is arranged in such a manner as to be most directed to a leading end part of a spark plug in a state in which the fuel injection device is attached to the engine.

5. The fuel injection device according to claim 1,
wherein a third straight line beyond a third outlet surface in the third injection hole axis of the third injection hole is formed in such a manner as not to intersect with any of the first straight line beyond the first outlet surface in the first injection hole axis of the first injection hole, and the second straight line beyond the second outlet surface in the second injection hole axis of the second injection hole.

6. The fuel injection device according to claim 1,
wherein the first injection hole and the second injection hole are arranged on an outer side in a radial direction and are arranged side by side in an outer peripheral direction when the injection hole-formed part is seen in the central axis direction.

7. The fuel injection device according to claim 6,
wherein in the injection hole-formed part, a third injection hole which is arranged on an opposite side of the second injection hole with respect to the first injection hole when the injection hole-formed part is seen in the central axis direction and in which a crossing angle between the central axis of the injection hole-formed part and a third injection hole axis becomes θ3 larger than θ1 is formed, and
a third straight line beyond a third outlet surface in the third injection hole axis of the third injection hole is formed in such a manner as not to intersect with the first straight line and the second straight line.

8. The fuel injection device according to claim 7,
wherein the crossing angle θ2 and the crossing angle θ3 are identical.

9. The fuel injection device according to claim 7,
wherein the first injection hole, the second injection hole, and the third injection hole are arranged on the outer side in the radial direction and are arranged in order of the second injection hole, the first injection hole, and the third injection hole in the outer peripheral direction when the injection hole-formed part is seen in the central axis direction.

* * * * *